Oct. 9, 1923.
J. LAUTH
CLUTCH MECHANISM
Filed April 30, 1920
1,470,268
2 Sheets-Sheet 2

Inventor:
Jacob Lauth,

Patented Oct. 9, 1923.

1,470,268

UNITED STATES PATENT OFFICE.

JACOB LAUTH, OF CHICAGO, ILLINOIS.

CLUTCH MECHANISM.

Application filed April 30, 1920. Serial No. 377,739.

*To all whom it may concern:*

Be it known that I, JACOB LAUTH, a citizen of the United States, residing at Chicago, in the county of Cook and State of Illinois, have invented a new and useful Improvement in Clutch Mechanism, of which the following is a specification.

This invention relates particularly to clutch mechanism adapted for automobile and motor vehicle use; and the primary object is to provide improved clutch mechanism of compact character. Additional objects are to provide for increased leverage in the clutch mechanism, ready adjustability, and easy accessibility to the parts.

The invention is illustrated in its preferred embodiment in the accompanying drawings, in which—

Figure 1:
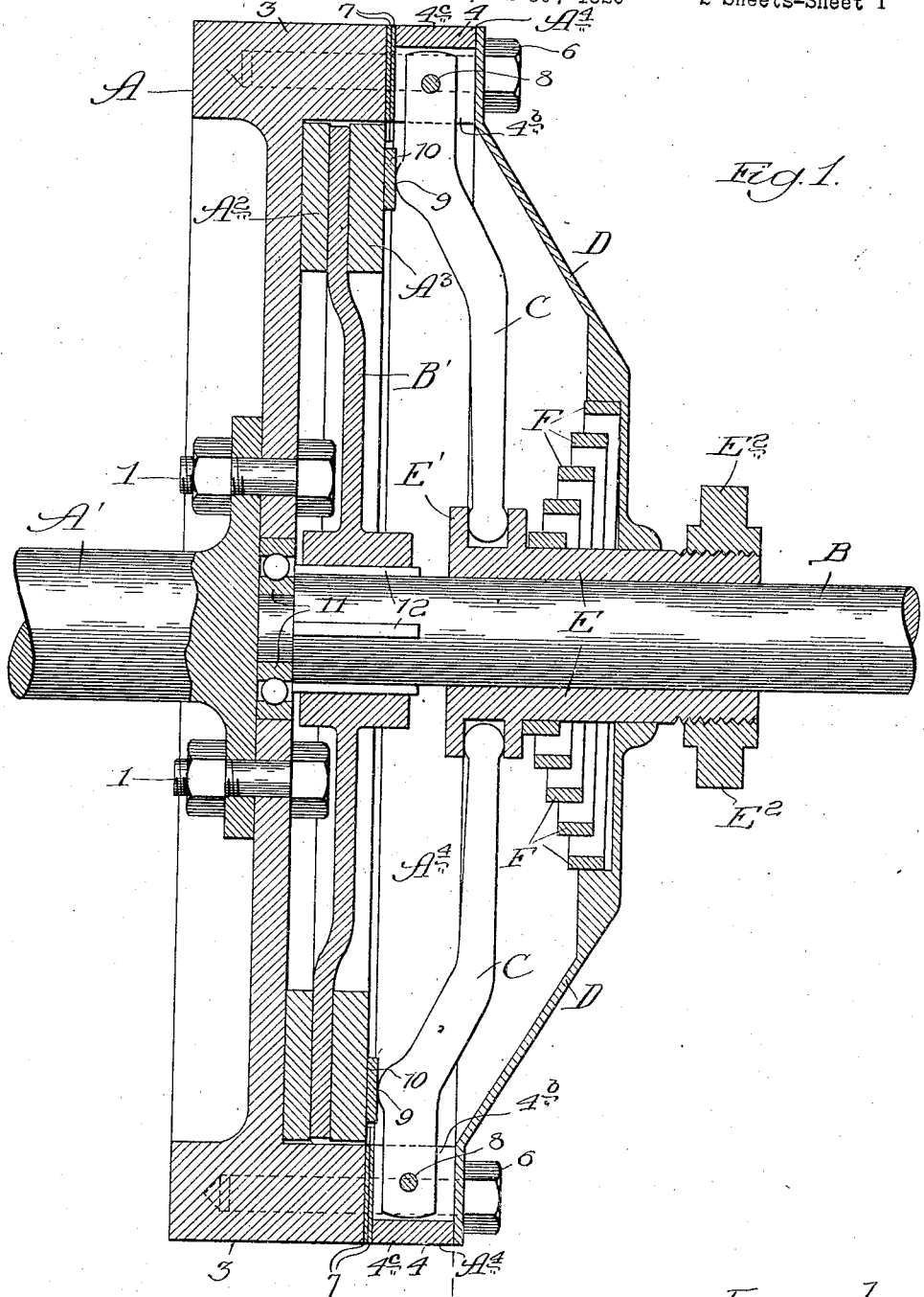
Figure 2:
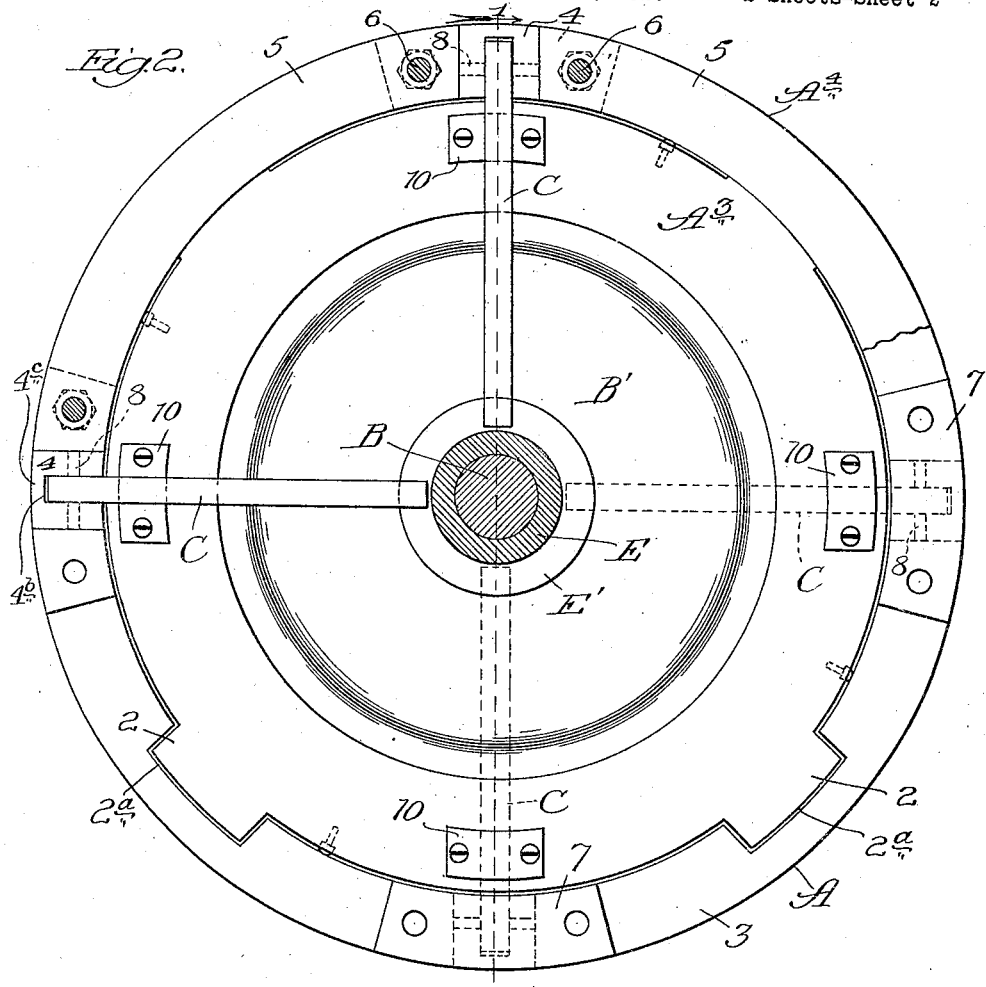
Figure 3:
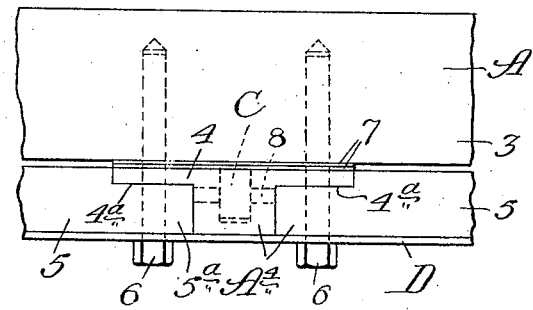

Figure 1 represents a broken sectional view of clutch mechanism embodying the invention, the section being taken as indicated at line 1 of Fig. 2; Fig. 2, a section taken as indicated at line 2 of Fig. 1, certain of the segments of a sectional ring employed in connection with the fly-wheel being removed, however; and Fig. 3, a broken plan view illustrating the manner in which the fly-wheel of the engine shaft is equipped with bearings for the levers employed.

In the construction illustrated, A represents a wheel, such as the fly-wheel of an engine shaft A'; A² and A³, a pair of friction rings or clamping members with which the fly-wheel is equipped; B, a shaft adapted to be actuated by the clutch mechanism, said shaft being equipped at its inner or front end with a wheel B', the peripheral portion of which is interposed between the clamping members A² and A³; C, a series of levers having their outer ends pivotally connected with a sectionally constructed ring A⁴ which is rigidly secured to the adjacent flange of the fly-wheel A, said levers being provided near their pivoted ends with cams adapted to bear against the clamping member A³; D, a housing member having its peripheral portion engaging the outer edge of the sectional ring A⁴ and secured therewith to the fly-wheel; E, a sleeve slidable on the shaft B, said sleeve having its inner end equipped with an integral collar E' provided with an annular groove which receives the inner ends of the levers C, said sleeve having its outer end equipped with a collar E² adapted for connection with a yoke operated by a foot-lever (not shown), whereby the sleeve E may be retracted to withdraw the levers C from the clamping position; and F, a heavy conical spring interposed between the hub portion of the member D and the collar E'.

The wheel A is shown rigidly secured to the shaft A' by means of bolts 1, this being a common method of securing a fly-wheel to an engine shaft. The clutch or clamping members A² and A³ comprise annular disks, or rings, of suitable friction board, having their outer peripheral portions equipped with projections or tenons 2 which project into radial recesses 2ª which are cut in the inner peripheral wall of the rearwardly projecting flange 3 of the fly-wheel. These clamping members are readily removable for renewal purposes. By reason of their tenon connection with the fly-wheel, they must rotate therewith; but they are capable of shifting in the direction of the axis of the fly-wheel.

The sectional ring A⁴, which serves as the means for connecting the levers C with the fly-wheel, preferably comprises segments 4 provided with bearings for the levers and segments 5 which alternate with the segments 4 and serve to complete the ring. The sectional ring A⁴, as has been indicated, abuts against the rearwardly presented flange 3 of the fly-wheel and is secured to the flange 3 by cap-screws 6. However, thin segments of metal or shims, 7 are interposed between the segments 4 and the flange 3. Each segment 4 is in the form of a block and of a curvature corresponding with the curvature of the periphery of the fly-wheel and having its end portions cut away, at the outer side, as indicated at 4ª. The segments 5 are curved to correspond with the curvature of the fly-wheel and are cut away at the inner sides of their end portions to accommodate the reduced portions 4ª of the segments 4. Thus, the segments 5 have reduced extensions 5ª which overlie the reduced end portions 4ª of the blocks 4. The central portions of the segmental blocks 4 are provided at their inner peripheral surfaces with radial slots or recesses 4ᵇ, the outer ends of said slots being covered by bridges 4ᶜ. The bolts 6 serve to secure the segments and the shims to the flange 3 of the fly-wheel in a manner which will be readily understood from Fig. 3.

The outer ends of the levers C extend into the radial slots 4$^b$ and are connected with pivots 8 mounted in the segmental blocks 4. Thus, the pivots 8 lie in the plane of the flange 3 of the fly-wheel. The levers C are provided just inside the ring A$^4$ with cam-projections 9 which engage metal bearing plates 10 which are secured to the outer or rear surface of the friction clamping member A$^3$.

The shaft B is provided in the usual manner with an anti-friction bearing 11 within the fly-wheel adjacent the end of the crank shaft A'. The wheel B' is mounted on the inner end of the shaft B, being connected therewith by splines 12, which permit the wheel B' to move longitudinally with relation to the shaft B, but cause the shaft B to rotate with the wheel B'.

The inner end portions of the lever C are offset from the transverse plane which contains the pivots 8, so as to engage the sleeve E, which is so positioned on the shaft B as to clear the hub of the wheel B' and permit the necessary shifting movement of the sleeve E longitudinally of the shaft B.

In practice, the whole mechanism shown is ordinarily mounted in a stationary casing or housing (not shown). Also, in practice, the member E is actuated by a yoke which extends through the housing mentioned and is secured to the usual rock-shaft equipped with a foot-lever (not shown).

The sleeve E slides freely through the hub portion of the housing member D which affords a bearing for the spring F and the hub portion of the member D is provided with a suitable socket for the base end of the spring F, and the small end of the spring bears against the collar E' of the sleeve E. Thus, the spring normally forces the inner ends of the levers C towards the fly wheel A, causing the clamping members A$^2$ and A$^3$ to clamp the peripheral portion of the wheel B'. When desired, the clutch may be released by shifting the sleeve E to the right from the position shown in Fig. 1, any suitable means being employed for the purpose.

It will be noted that the construction enables long levers to be used, and said levers have pivotal connections only at their outer ends, these pivotal connections being located in the plane of the flange 3 of the fly-wheel. The construction permits the use of a comparatively narrow fly-wheel, as it is necessary only to provide housing space within the flange 3 for the friction disks A$^2$ and A$^3$ and the interposed wheel B'. Moreover, the bearings 10 may be disposed close to the flange 3, so that the short arms of the levers C may be reduced and a long leverage obtained. The mechanism is exceedingly compact, measured along the axis of the mechanism; and, obviously, any desired diameter of fly-wheel may be adopted.

If, by reason of wear, it becomes necessary to adjust the levers, this may be effected by taking out the bolts 6 and removing the shims 7, it being noted that the levers can be adjusted by adjusting the sectionally constructed ring A$^4$ which constitutes, in effect, an adjustable extension of the flange 3 of the fly-wheel.

The foregoing detailed description has been given for clearness of understanding only and no unnecessary limitation should be understood therefrom, but the appended claim should be construed as broadly as permissible in view of the prior art.

What I regard as new, and desire to secure by Letters Patent, is—

In clutch mechanism, the combination of a wheel provided with a flange, a pair of clamping members encircled by said flange, a shaft equipped with a wheel having its peripheral portion interposed between said clamping members, a ring comprising segmental blocks provided with radial slots and segmental blocks alternating with said first-named blocks, levers having their outer ends pivoted in the slots of said first-named blocks, a housing member having a hub portion through which said shaft extends, bolts connecting said housing member and said segmental blocks to the flange of said first-named wheel, a sleeve mounted on said shaft and extending through the hub portion of said housing member, said sleeve having its inner end equipped with a bearing for said levers and its outer end equipped with means for actuating the sleeve, and a spring interposed between the hub portion of said housing member and the inner ends of said levers.

JACOB LAUTH.